(12) United States Patent
Delplanque et al.

(10) Patent No.: US 11,035,475 B2
(45) Date of Patent: Jun. 15, 2021

(54) VALVE PROVIDED WITH A STABILIZING MEMBER SECURED TO THE FLAP AND EXHAUST LINE EQUIPPED WITH SUCH A VALVE

(71) Applicant: FAURECIA SYSTEMES D'ECHAPPEMENT, Nanterre (FR)

(72) Inventors: Gilbert Delplanque, Sochaux (FR); Ronan Botella, Chevremont (FR); Yannick Bredent, Nommay (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/452,935

(22) Filed: Jun. 26, 2019

(65) Prior Publication Data
US 2020/0003333 A1 Jan. 2, 2020

(30) Foreign Application Priority Data
Jun. 27, 2018 (FR) ...................................... 18 55811

(51) Int. Cl.
*F16K 1/22* (2006.01)
*F16K 47/04* (2006.01)

(52) U.S. Cl.
CPC ............ *F16K 1/225* (2013.01); *F16K 47/045* (2013.01)

(58) Field of Classification Search
CPC .......... F16K 1/222; F16K 1/224; F16K 1/225; F16K 27/0218; F02D 9/1005; F02D 9/101; F02D 9/1015; F02D 9/102; F02D 9/103; F02D 9/1035; F02D 9/106
See application file for complete search history.

(56) References Cited

U.S. PATENT DOCUMENTS

| | | | | |
|---|---|---|---|---|
| 5,125,624 | A * | 6/1992 | Yohner | F16K 1/22 251/305 |
| 6,997,240 | B2 * | 2/2006 | Denk | B60H 1/00678 165/42 |
| 2017/0089270 | A1 * | 3/2017 | Oblinger | F16K 1/22 |
| 2018/0274452 | A1 * | 9/2018 | Hiramoto | F02D 9/10 |

FOREIGN PATENT DOCUMENTS

| | | |
|---|---|---|
| DE | 10032974 A1 | 2/2006 |
| DE | 10052423 A1 | 5/2011 |
| FR | 2754583 A1 | 4/1998 |
| JP | 349038781 B1 | 10/1974 |

OTHER PUBLICATIONS

French Search Report for French Application No. 1855811 dated Mar. 11, 2019.

* cited by examiner

*Primary Examiner* — Hailey K. Do
(74) *Attorney, Agent, or Firm* — Carlson, Gaskey & Olds, P.C.

(57) ABSTRACT

A valve comprises a flap, a tubular valve body defining an exhaust gas flow passage, and a device to guide the flap relative to the valve body to allow the flap to pivot relative to the valve body around a pivot axis between a closing position and a freed position of the exhaust gas flow passage. The flap has two large faces substantially parallel to one another and connected to one another by an edge of the flap. The guide device comprises a pin, a distal, end and a base. The valve also comprises a stabilizing member secured to the flap.

20 Claims, 6 Drawing Sheets

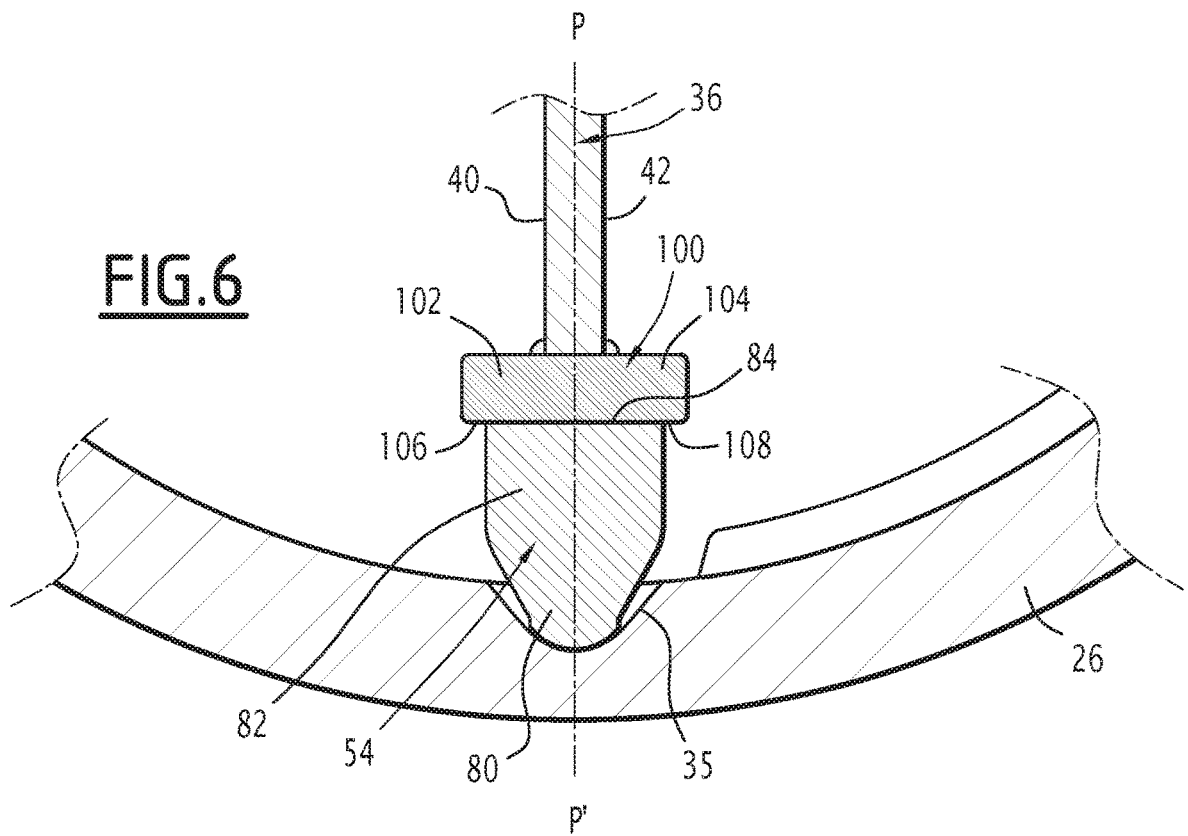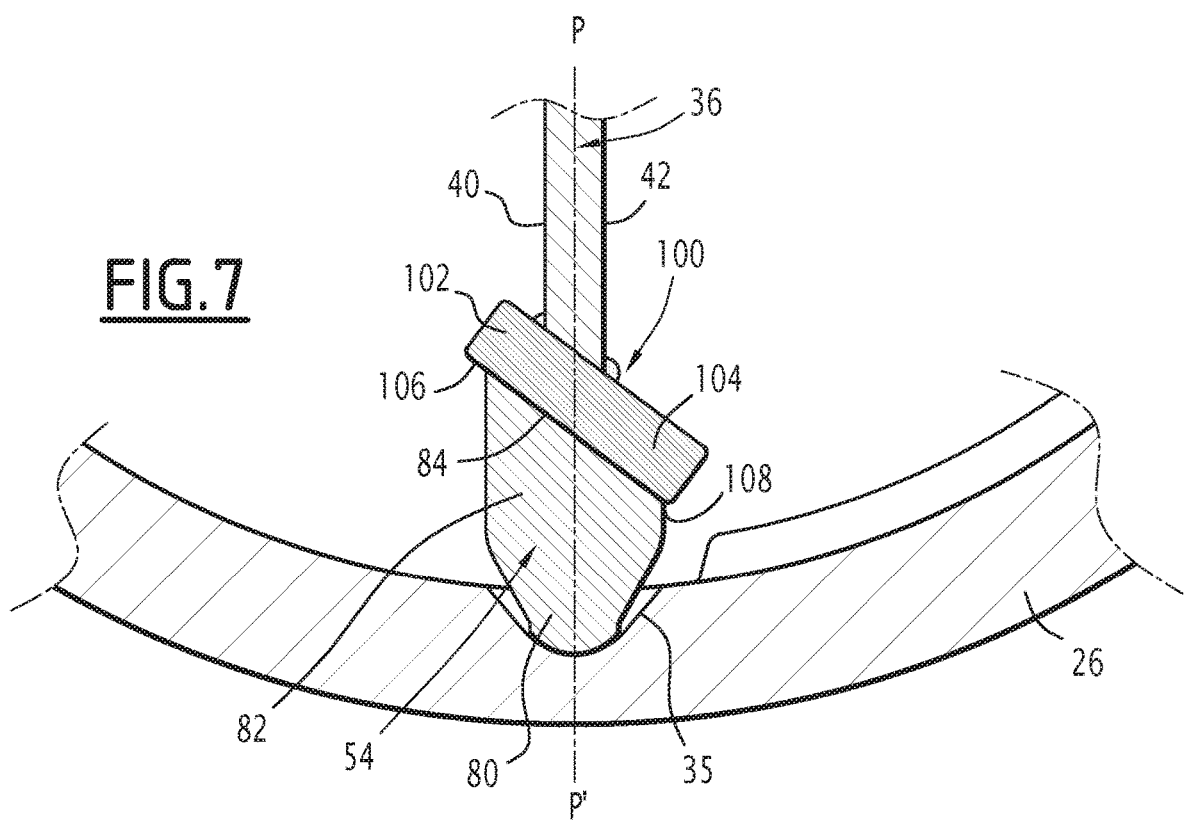

VALVE PROVIDED WITH A STABILIZING MEMBER SECURED TO THE FLAP AND EXHAUST LINE EQUIPPED WITH SUCH A VALVE

CROSS-REFERENCE TO RELATED APPLICATIONS

This application is a U.S. non-provisional application claiming the benefit of French Application No. 18 55811, filed on Jun. 27, 2018, which is incorporated herein by its entirety.

FIELD OF INVENTION

The present invention relates to a valve, of the type comprising a flap, a tubular valve body defining an exhaust gas flow passage, and a device to guide the flap relative to the valve body to allow the flap to pivot relative to the valve body around a pivot axis between a closing position and a freed position of the exhaust gas flow passage, the flap having two large faces substantially parallel to one another and connected to one another by an edge of the flap. The guiding device comprises a pin including a distal end, passed through by the pivot axis, bearing against the valve body, and a base that defines a bearing face opposite the distal end and passed through by the pivot axis. The base has at least one slot in which the edge of the flap is received.

The invention also relates to a motor vehicle exhaust line comprising such a valve.

BACKGROUND OF THE INVENTION

The valves of the aforementioned type are known and are generally mounted on motor vehicle exhaust lines, where they are used to regulate the flow of exhaust gases from a heat engine. Most often, the valve body and the flap of these valves are made from steel, and the pin is made from ceramic, since this material has good tribological characteristics with respect to steel.

One drawback related to the use of these materials is that the pin is very brittle and risks breaking if an excessive separating force is applied between the walls of the slot. So as to accommodate the thermal expansion of the flap, this slot generally has a width greater than the thickness of the slot; thus, despite the very high temperatures to which the valve may be subjected in an exhaust line, the flap can expand without risk of bearing against the walls of the slot.

The play thus left between the flap and the walls of the slot is, however, problematic. Indeed, due to this play, the flap can move relative to the pin. Yet the flow of exhaust gases that the flap opposes exerts a force on the flap of variable intensity that causes to-and-fro movements of the flap, which abuts, upon each to-and-fro movement, against the walls of the slot, causing a chattering noise that is audible for the occupants of the passenger compartment. This chattering noise gives users an impression of poor quality of the vehicle that may be particularly detrimental for top-of-the-line vehicles.

A first aim of the invention is to eliminate this chattering noise. Another aim is to achieve this first aim simply and economically.

SUMMARY OF THE INVENTION

A valve of the aforementioned type, further includes a stabilizing member secured to the flap, said stabilizing member having two protruding portions each protruding opposite the pivot axis relative to a respective large face of the flap, each protruding portion being in contact with the bearing face of the pin.

According to specific embodiments of the invention, the valve also has one or more of the following features, considered alone or according to any technically possible combination(s):

- The or each protruding portion has a support face in contact with the bearing face of the pin, said support face being substantially planar.
- The bearing face of the pin is substantially planar.
- The support face is substantially parallel to the bearing face of the pin.
- The bearing face of the pin is substantially orthogonal to the pivot axis.
- The bearing face of the pin is inclined relative to the pivot axis, said bearing face forming, with the pivot axis, a minimal angle comprised between 30° and 60°, preferably comprised between 40° and 50°.
- The stabilization member is attached, in particular welded, on the flap.
- The stabilization member is made up of a plate.
- There are two slots, each slot being substantially parallel to the pivot axis.
- The flap has a notch in which the pin is partially housed.
- The stabilizing member is engaged in the notch, in particular in the wide bottom segment of the notch.
- The width of the or each slot is larger than that of the edge of the flap.
- The pin has a thermal expansion coefficient lower than that of the flap, and
- The or each slot emerges in the bearing face.

The invention also relates to a motor vehicle exhaust line comprising a valve as defined above.

The invention also relates to a motor vehicle comprising a motor vehicle exhaust line as defined above

BRIEF DESCRIPTION OF THE DRAWINGS

Other features and advantages of the invention will appear upon reading the following description, provided solely as an example and done in reference to the appended drawings, in which:

FIG. 6 is a sectional view of the detail marked IV of FIG. 3, according to a second variant of the invention, and FIG. 7 is a sectional view of the detail marked IV of FIG. 3, according to a third variant of the invention.

DETAILED DESCRIPTION

Figure 1:
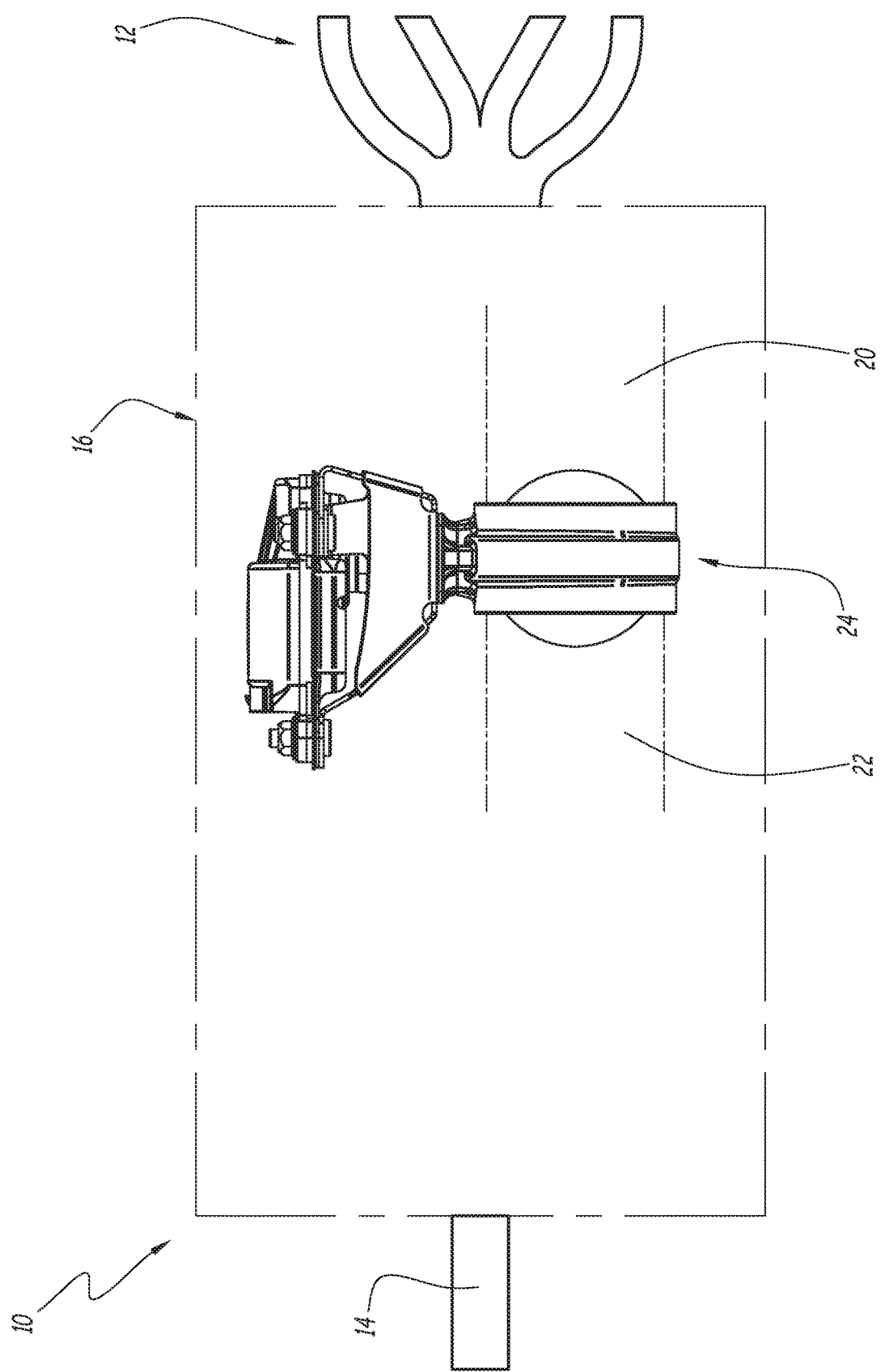
FIG. 1 is a schematic view of an exhaust line according to the invention.

The exhaust line 10 shown in FIG. 1 is on board a motor vehicle (not shown). It comprises, in a known manner, a manifold 12 for collecting the exhaust gases from a heat engine (not shown) of the vehicle, an outlet orifice 14 for releasing the exhaust gases outside the vehicle and, between the manifold 12 and the outlet orifice 14, a network of pipes 16 for guiding the exhaust gases from the manifold 12 to the outlet orifice 14.

The network of pipes 16 preferably includes at least one piece of pollution control equipment (not shown) for controlling pollution from the exhaust gases and at least one piece of noise control equipment (not shown) suitable for minimizing the sound produced by the exhaust gases when they exit through the outlet orifice 14.

The network of pipes 16 also includes an upstream exhaust gas intake pipe 20, a downstream exhaust gas discharge pipe 22 and, inserted between the upstream and downstream pipes 20, 22, a valve 24 whose role is to monitor the passage of the exhaust gases between the upstream and downstream pipes 20, 22. Optionally, this valve 24 is part of a piece of pollution control equipment or a piece of noise control equipment of this network of pipes 16.

Figure 2:
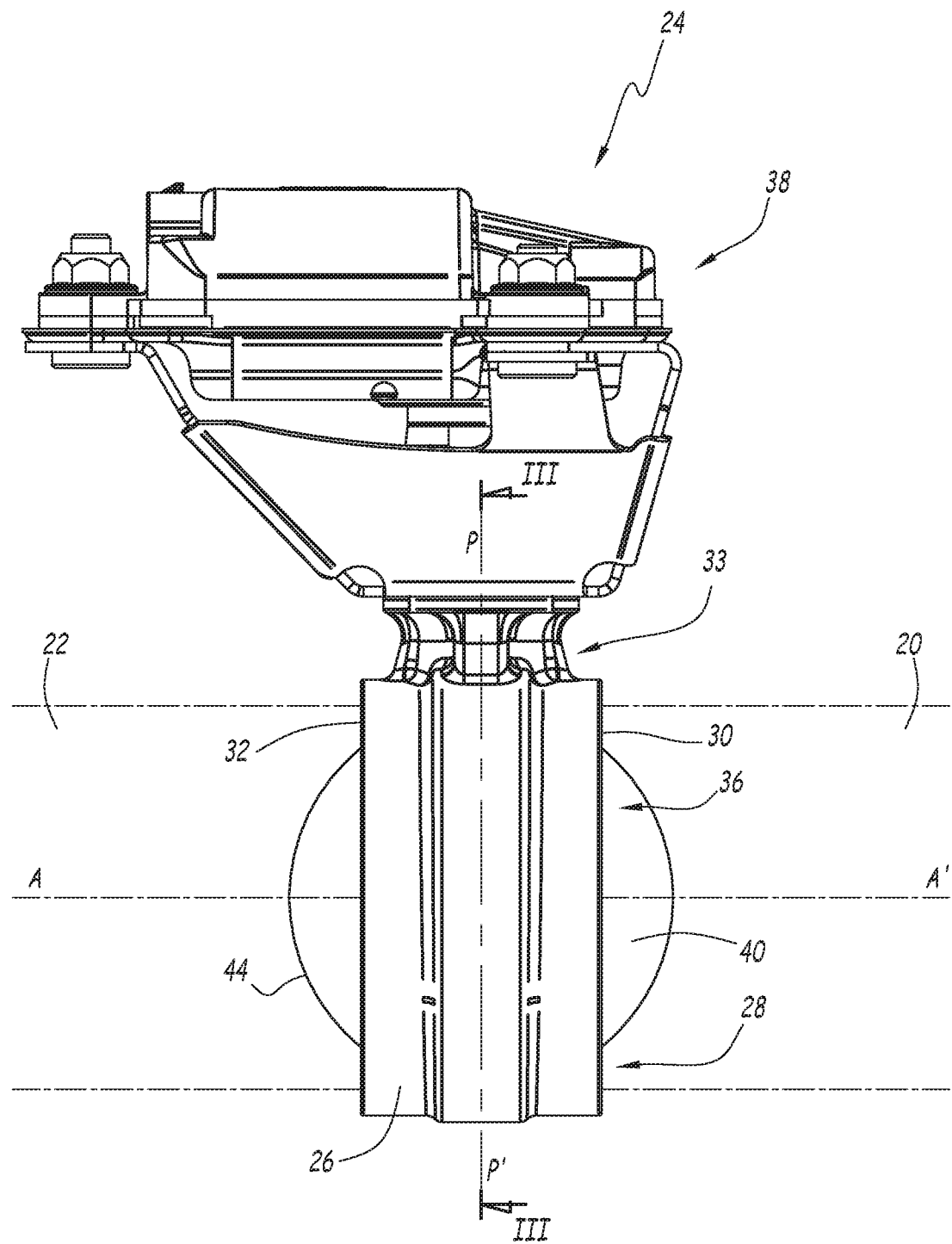
FIG. 2 is an elevation side view of the exhaust line of FIG. 1.

In reference to FIG. 2, the valve 24 comprises a tubular valve body 26, intended to contain the exhaust gases, defining a circulation passage 28 for the exhaust gases extending along the central axis A-A' from an upstream end 30, fluidly connected to the upstream pipe 20, to a downstream end 32, fluidly connected to the downstream pipe 22.

Hereinafter, the orientation terms are to be understood in reference to the usual orientation of an axis, the descriptor "axial" designating the directions parallel to the axis A-A' and the descriptor "radial" designating the directions perpendicular to the axis A-A'. It will be noted that "perpendicular" is used here to designate directions orthogonal to one another and having a point of intersection.

The valve body 26 also has a fastening flange 33 and has a through opening 34 (FIG. 3) along a radial direction P-P, said through opening 34 extending through the fastening flange 33 and emerging radially in the circulation passage 28 of the exhaust gases and outside the valve body 26.

Figure 3:
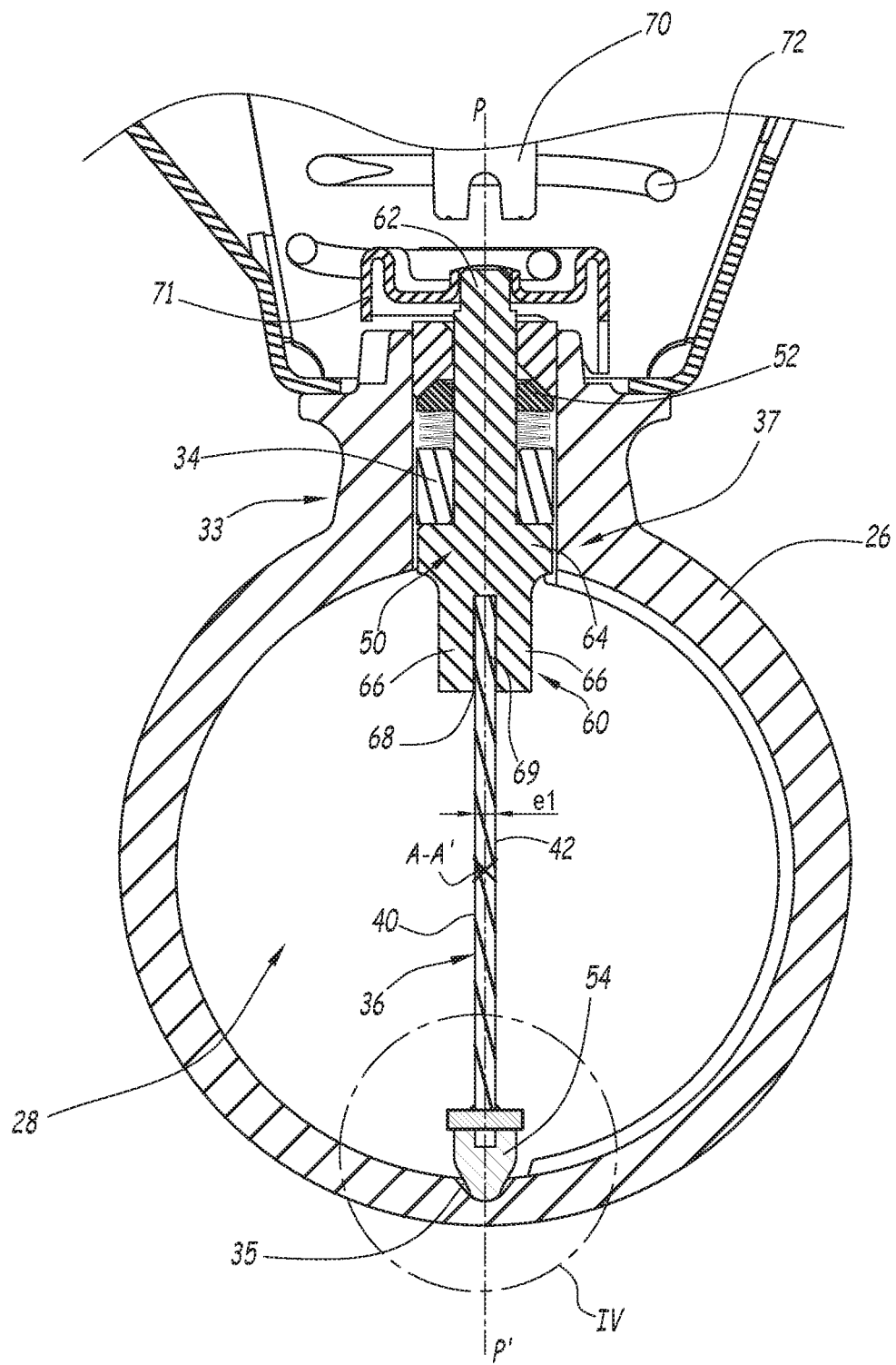
FIG. 3 is an axial sectional view, along a plane marked III-III in FIG. 2, of the valve of FIG. 2, according to a first variant of the invention.

In reference to FIG. 3, the valve body 26 further defines a recess 35 in an inner face of the valve body 26 oriented toward the circulation passage 28 of the exhaust gases. This recess 35 is arranged diametrically opposite the through opening 34 relative to the axis A-A', and it is aligned with the radial direction P-P'. The recess 35 typically has a frustoconical shape with a hemispherical bottom.

The valve 24 also comprises a flap 36 movable inside the valve body 26, and a device 37 for guiding the flap 36 relative to the valve body 26 to allow the pivoting of the flap 36 relative to the valve body 26 around the direction P-P' between a closed position and a freed position of the exhaust gas circulation path 28, said direction P-P' thus constituting a pivot axis of the flap 36. This pivot axis P-P' being radial, the valve body 26, the flap 36 and the guide device 37 together form a butterfly valve.

The valve 24 also comprises a motorized actuator 38 to command the movement of the flap 36 between its closed and freed positions.

As shown in FIGS. 2 and 3, the flap 36 is substantially planar. It thus comprises two large faces 40, 42, each planar and substantially parallel to the other, said faces 40, 42 being connected to one another by an edge 44 of the flap 36. Each of the large faces 40, 42 of the flap 36 has a shape substantially complementary to the radial section of the exhaust gas circulation passage 28.

In the closed position, the flap 36 is oriented substantially transversely to the exhaust gas circulation passage 28, i.e., each of its large faces 40, 42 is arranged substantially perpendicular to the axis A-A'. In the freed position, shown in FIGS. 2 and 3, the flap 36 is oriented substantially parallel to the exhaust gas circulation passage 28, i.e., each of its large faces 40, 42 is arranged substantially parallel to the axis A-A'.

The flap 36 has a thickness el, defined as being the distance of the large faces 40, 42 from one another.

The flap 36 is typically made from metal, for example from steel.

In reference to FIG. 3, the device 37 for guiding the flap 36 comprises a shaft 50 engaged in the opening 34 and connected to the flap 36, a bearing 52 for guiding the shaft 50 relative to the valve body 26, and a pin 54 passed through by the pivot axis P-P', engaged in the recess 35 and connected to the flap 36.

The shaft 50 is substantially coaxial to the axis P-P' and extends all the way through the through opening 34. It has a first end 60 for connecting to the flap 36, and a second end 62 for connecting to the actuator 38.

The shaft 50 is secured to the flap 36 in rotation around the axis P-P'. To that end, the first end 60 comprises, in the illustrated example, a base 64 and two lugs 66 protruding from the base 64 toward the center of the exhaust gas circulation passage 28, said lugs 66 defining a slot 68 between them in which a rim 69 of the flap 36 is received. Advantageously, the flap 36 is further welded to the shaft 50.

The shaft 50 is able to be rotated around the axis P-P' by the actuator 38. To that end, the second end 62 is secured to a driving part 71, which in turn is connected to an output shaft 70 of the actuator 38 with a connecting member 72.

The connecting member 72 is preferably suitable for minimizing the heat transfers between the shaft 50 of the guiding device 37 of the flap 36 and the output shaft 70 of the actuator 38. To that end, the connecting member 72 is, in the illustrated example, made up of a metal strand configured in a spiral.

The shaft 50 is typically made from metal, for example from steel, and preferably from stainless steel.

The guide bearing 52 of the shaft 50 here is housed in the opening 34. It is typically formed by a ring of material with a low friction coefficient, for example a ceramic, arranged between the shaft 50 and a wall of the opening 34.

Figure 4:
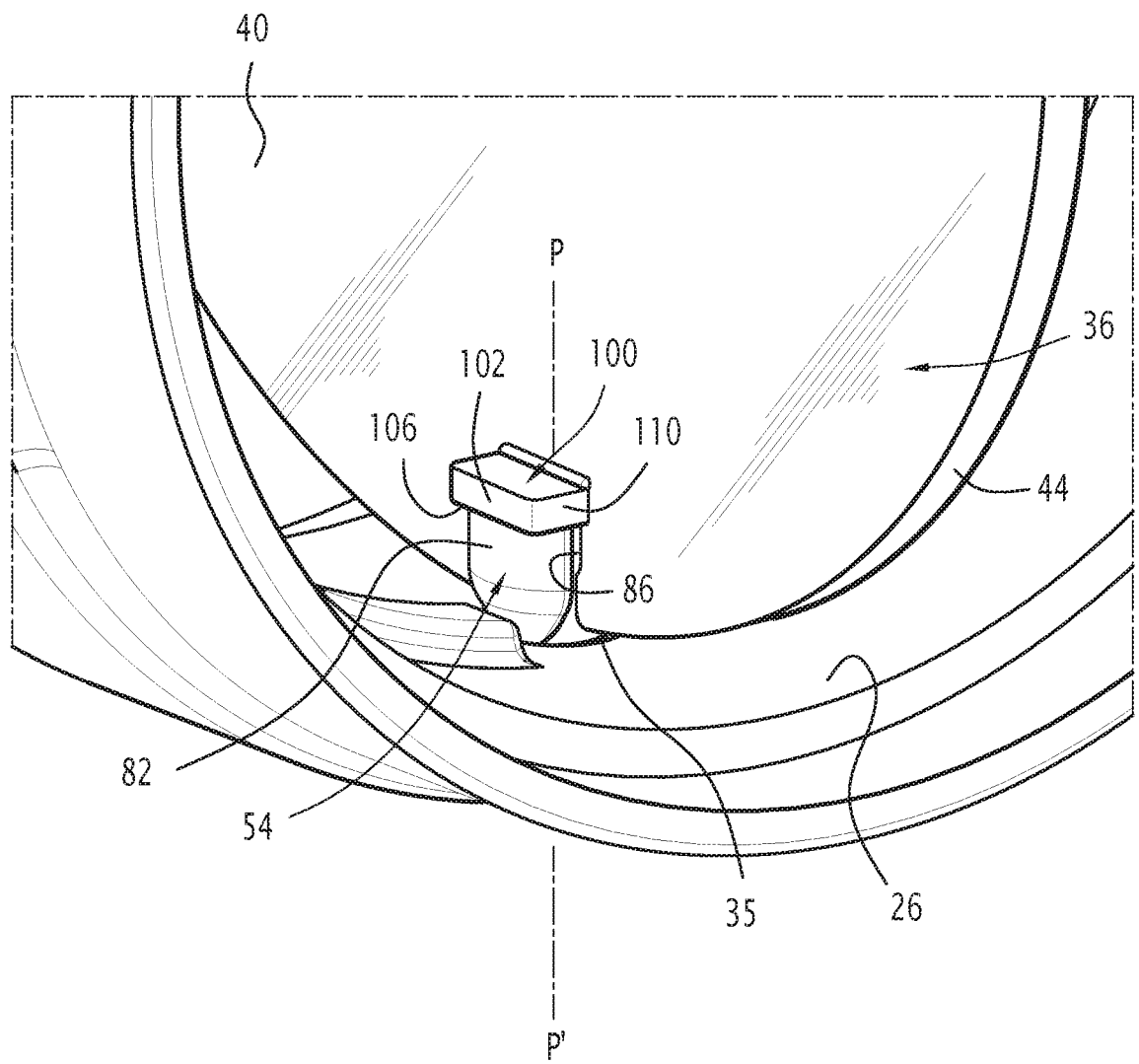
FIG. 4 is a perspective view of a detail marked IV of FIG. 3.
Figure 5:
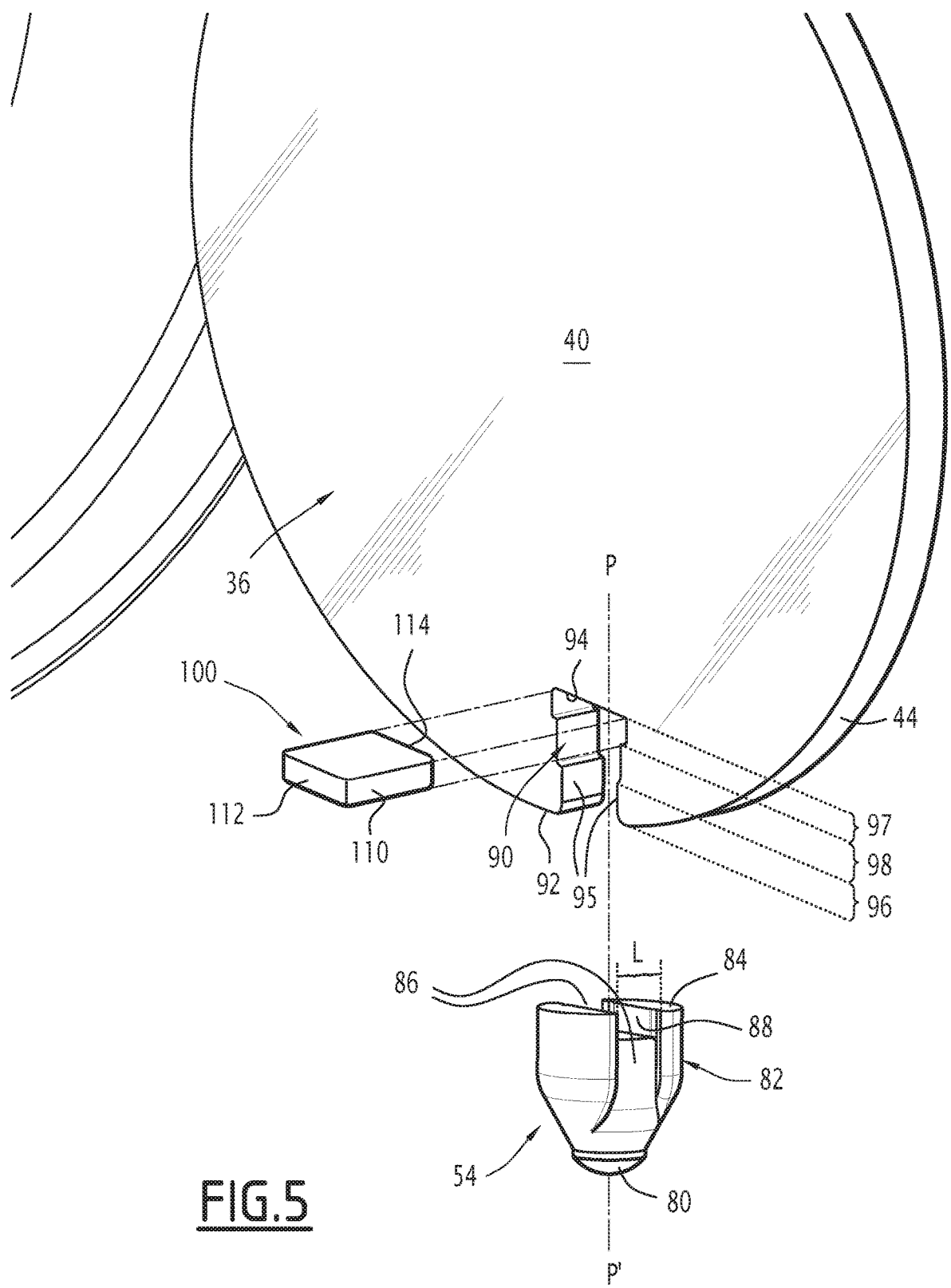
FIG. 5 is an exploded view of the elements of FIG. 4.

In reference to FIGS. 4 and 5, the pin 54 comprises a distal end 80 passed through by the pivot axis P-P', received in the recess 35 and bearing against the valve body 26. The pin 54 also comprises a base 82 defining a bearing face 84 opposite the distal end 80 and passed through by the pivot axis P-P'.

The pin 54 is, for example, made exclusively from ceramic. It has a thermal expansion coefficient lower than that of the flap 36 and a tenacity typically below 7 MPa·m$^{1/2}$.

The bearing face 84 of the pin 54 is substantially planar. In this first variant, the bearing face 84 of the pin 54 is further substantially orthogonal to the pivot axis P-P' and to each of the large faces 40, 42 of the flap 36.

The base 82 further has at least one slot, in which the edge 44 of the flap is in particular received. According to one example that is not shown, the base 82 has a single slot 86.

As shown for example in FIG. 5, the base 82 has two slots 86 each oriented substantially parallel to the pivot axis P-P' and each emerging in the bearing face 84. These slots 86 are arranged diametrically opposite one another relative to the pivot axis P-P', i.e., the pivot axis P-P' is inserted between said slots 86.

The edge 44 of the flap 36 is received in each of these slots 86. Each slot 86 has a width L substantially greater than the thickness el of the flap 36; in other words, the width L of each slot 86 is greater than that of the edge 44 of the flap 36.

Thus, each slot 86 leaves enough space for the edge 44 of the flap 36 so that it can expand without risk of causing breaking of the pin 54.

In the first variant, the base 82 of the pin 54 also has a groove 88 arranged in the bearing face 84 of the pin 54 and connecting the slots 86 to one another. The bearing surface 84 of the pin 54 is therefore divided into two substantially coplanar half-surfaces.

The groove 88 here has substantially the same width as the slots 86.

In reference to FIG. 5, the pin 54 is partially housed in a notch 90 arranged in the flap 36.

This notch 90 is arranged in a rim 92 of the flap 36 opposite the rim 69. It is further a through notch and emerges in each of the large faces 40, 42 of the flap 36.

The notch 90 is bordered by a bottom wall 94 and by two side walls 95 arranged opposite one another and each extending from the bottom wall 94 to the opening by which the notch 90 emerges outside the flap 36. This bottom wall 94 and the side walls 95 belong to the edge 44 of the flap 36.

The notch 90 has a narrow segment 96, in which the side walls 95 are at a distance from one another substantially equal to the distance between the bottoms of the slots 86 of the pin 54. This narrow segment 96 here makes up an end segment of the notch 90 by which the notch 90 emerges outside the flap 36.

The notch 90 also has a wide bottom segment 97, in which the side walls 95 are at a distance from one another greater than the distance between the bottoms of the slots 86 of the pin 54 and preferably greater than or equal to the diameter of the pin 54.

In the illustrated example, the notch 90 also has an intermediate segment 98, in which the side walls 95 are at an intermediate distance from one another, between the width of the narrow segment 96 and the width of the wide bottom segment 97. This intermediate segment 98 is inserted between the narrow segment 96 and the wide bottom segment 97.

According to the invention, the valve 24 also comprises a stabilizing member 100, secured to the flap 36, to stabilize the pin 54 and prevent the latter from pivoting relative to the flap 36 around any axis orthogonal to the pivot axis P-P'.

To that end, stabilizing member 100 has two protruding portions 102, 104 (FIG. 6) each protruding opposite the pivot axis P-P' relative to a respective large face 40, 42 of the flap 36, each protruding portion 102, 104 being in contact with the bearing face 84 of the pin 54. Each protruding portion 102, 104 further has a support face 106, 108 (FIG. 6) in contact with the bearing face 84 of the pin 54. This support face 106, 108 is in particular substantially planar and parallel to the bearing face 84 of the pin 54.

As shown in FIG. 5, the stabilizing member 100 is, in the illustrated example, made up of a metal plate 110 attached on the flap 36 and fastened to the latter, typically by welding, for example by tungsten inert gas (TIG) welding, laser welding or resistance welding, or by brazing. This plate 110 is engaged in the notch 90, in particular in the bottom segment 97 of the notch 90, perpendicular to the pivot axis P-P', such that a first rim 112 of the plate 110 protrudes outside the notch 90 relative to one of the large faces 40, a second opposite rim 114 protruding outside the notch 90 relative to the other large face 42; the first rim 112 thus constitutes the first protruding portion 102 of the stabilizing member 100, and the second rim 114 constitutes the second protruding portion 104 of the stabilizing member 100.

Advantageously, the plate 110 comes from the same blank as that used to produce the flap 36.

The variant of FIG. 6 differs from the first variant described above only in that the pin 54 does not comprise a groove 88 arranged in the bearing face 84 of the pin 54. The bearing face 84 of the pin 54 is then continuous.

The variant of FIG. 7 differs from this second variant in that the bearing face 84 of the pin 54 is not orthogonal to the pivot axis P-P' but inclined relative to the latter when said bearing face 84 is seen along a plane perpendicular to the large faces 40, 42 of the flap 36. Said bearing face 84 then forms, with the pivot axis P-P', a minimal angle of between 30° and 60°, and preferably of between 40° and 50°.

This variant makes it possible to keep the pin 54 bearing against one of the faces 40, 42 of the flap 36 and prevents the pin 54 from moving relative to the flap 36 along a direction orthogonal to the faces 40, 42.

Owing to the invention described above, the pin 54 is prevented from pivoting relative to the flap 36 around any axis orthogonal to the pivot axis P-P'. Thus, chattering noises are avoided.

Furthermore, this technical effect is obtained in a particularly simple and cost-effective manner, which can also be applied on existing valves.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A valve comprising:
    a flap;
    a tubular valve body defining an exhaust gas flow passage;
    a guiding device to guide the flap relative to the tubular valve body to allow the flap to pivot relative to the tubular valve body around a pivot axis between a closing position and a freed position of the exhaust gas flow passage, the flap having two large faces substantially parallel to one another and connected to one another by an edge of the flap, the guiding device comprising a pin including:
        a distal end, traversed by the pivot axis, bearing against the tubular valve body, and
        a base, which defines a bearing face opposite the distal end and traversed by the pivot axis, and wherein the base has at least one slot in which the edge of the flap is received; and
    a stabilizing member secured to the flap, the stabilizing member having two protruding portions, each protruding portion protruding opposingly from the pivot axis beyond a respective one of the two large faces of the flap, each protruding portion being in contact with the bearing face of the pin, and wherein at least one of the two protruding portions has a support face in contact with the bearing face of the pin, the support face being planar.

2. The valve according to claim 1, wherein the bearing face of the pin is planar and the support face is substantially parallel to the bearing face of the pin, and wherein the support face has a planar surface extending from one end of the protruding portion to an opposite end of the protruding portion.

3. The valve according to claim 1, wherein the at least one slot comprises two slots, each slot being substantially parallel to the pivot axis.

4. The valve to claim 1, wherein a width of the at least one slot is larger than that of the edge of the flap.

5. The valve according to claim 1, wherein the pin has a thermal expansion coefficient lower than that of the flap.

6. A motor vehicle exhaust line comprising a valve according to claim 1.

7. A motor vehicle comprising a motor vehicle exhaust line according to claim 6.

8. The valve according to claim 1, wherein the tubular valve body is positioned downstream of an exhaust manifold that receives heat engine exhaust gases, and wherein the tubular valve body has an inlet to the exhaust gas flow passage that receives the heat engine exhaust gases.

9. The valve according to claim 1, wherein the flap has a notch in which the pin is partially housed.

10. The valve according to claim 9, wherein the stabilizing member is engaged in the notch, in particular in a wide bottom segment of the notch.

11. The valve according to claim 1, wherein the bearing face of the pin is planar and has a groove arranged in the bearing face of the pin that divides the bearing surface of the pin into two coplanar half-surfaces.

12. The valve according to claim 11, wherein the bearing face of the pin is substantially orthogonal to the pivot axis.

13. The valve according to claim 11, wherein the bearing face of the pin is inclined relative to the pivot axis, the bearing face forming, with the pivot axis, a minimal angle comprised between 30° and 60°.

14. The valve according to claim 13, wherein the bearing face forms, with the pivot axis, a minimal angle comprised between 40° and 50°.

15. The valve according to claim 1, wherein the stabilizing member comprises a plate that is secured to the flap.

16. The valve according to claim 15, wherein the plate is engaged in a notch arranged in a rim of the flap and which emerges in each of the two large faces of the flap.

17. The valve according to claim 16, wherein the notch is bordered by a bottom wall and by two side walls arranged opposite one another and each extending from the bottom wall to an opening by which the notch emerges outside the flap, and wherein the notch has a narrow segment and a wide bottom segment at the bottom wall that is wider than the narrow segment, and wherein the plate is engaged within the wide bottom segment.

18. The valve according to claim 17, wherein the at least one slot comprises at least two slots, and wherein the narrow segment is defined by the two side walls which are at a first distance from one another substantially equal to a distance between bottoms of the at least two slots of the pin.

19. The valve according to claim 18, wherein the wide bottom segment is defined by the two side walls which are at a second distance from one another greater than the distance between the bottoms of the at least two slots, and wherein the second distance is greater than or equal to a diameter of the pin.

20. The valve according to claim 19, wherein the notch includes an intermediate segment defined by the two side walls which are at a third distance from one another, the third distance being less than the second distance and greater than the first distance, and wherein the intermediate segment is between the narrow segment and the wide bottom segment.

* * * * *